United States Patent [19]
Wu et al.

[11] Patent Number: 6,041,105
[45] Date of Patent: Mar. 21, 2000

[54] ADAPTER CIRCUITRY FOR COMPUTERS TO SUPPORT COMPUTER TELEPHONY

[75] Inventors: Chung-Yu Wu, Hsinchu; Ching-Piao Su, Taipei, both of Taiwan

[73] Assignee: Umax Data Systems Inc., Hsinchu, Taiwan

[21] Appl. No.: 09/144,438

[22] Filed: Sep. 1, 1998

[51] Int. Cl.$^7$ .................................................. H04M 11/00
[52] U.S. Cl. ................... 379/93.05; 379/93.31; 379/93.36
[58] Field of Search .............................. 379/93.01, 93.05, 379/93.28, 93.31, 93.36, 442

[56] References Cited

U.S. PATENT DOCUMENTS

| | | | |
|---|---|---|---|
| 5,343,516 | 8/1994 | Callele et al. | 379/93.05 |
| 5,408,614 | 4/1995 | Thornton et al. | 3779/93.05 |

*Primary Examiner*—Paul Loomis
*Assistant Examiner*—Melur Ramakrishnaiah
*Attorney, Agent, or Firm*—McDermott, Will & Emery

[57] ABSTRACT

An external adapter circuitry is plugged into the printer port of a host computer to provide the utility of computer telephony for the host computer. The circuitry is housed in a compact box which is about the size of a common parallel port connector. The circuitry consists of a telephone line interface for receiving and sending signals from/to the telephone line; a printer port interface for sending data to and receiving data from the host computer; a couple of registers for latching signal-in and signal-out; a A/D converter for converting analog signals to digital signals; and a D/A converter for converting digitized signals to analog signals. More specially, the electricity of the entire circuitry is supplied from a signal-to-power converter which obtains voltages from the printer port. Therefore, the external adapter circuitry does not need a power line for external power supply.

17 Claims, 3 Drawing Sheets

ADAPTER CIRCUITRY FOR COMPUTERS TO SUPPORT COMPUTER TELEPHONY

BACKGROUND OF THE INVENTION

A. Field of the Invention

The invention relates to an adapter circuitry, especially to an external adapter circuitry for plugging into a printer port of a host computer for supporting computer telephony.

B. Description of the Prior Art

It is known that a MODEM is a circuit that uses digital data to modulate and demodulate a carrier wave so that digital data can be transmitted over an analog telephone network. The prior art technology uses a MODEM for supporting computer telephony for a host computer, including data transmission, facsimile, voice mail, call logging and even call blocking.

The first generation MODEM is a stand-alone device which communicates with a host computer via a serial communication port. There are two phone jacks residing on the circuit board of the MODEM for connecting to a telephone line and a telephone set. The circuit board of the MODEM contains a dedicated processor, usually a digital signal processor, for executing modulation/ demodulation, data computing, data processing and data permutation. It also has a power line for external power supply.

Since a digital signal processor is expensive, later development uses application software to replace a processor for a MODEM. It helps to reduce the cost of a MODEM and simplify the circuitry of a MODEM. Since the functionality of a MODEM will not be complete without application software, so the combination of a MODEM and its applicable software is then called "Software MODEM". Software MODEM is typically in the form of a circuit board that plugs into an internal slot of a host computer and communicates with the processor of the computer over a standard bus. It also has two phone jacks residing on the circuit board of the MODEM for connecting to a telephone line and a telephone set. It has no power line because the power supply directly comes from the host computer. The problem for the Software MODEM is that it is inconvenient to be installed. A user has to open the case of the host computer to plug the MODEM adapter card into the internal slot of the motherboard.

Due to the popularity of Internet communication, recently motherboard manufactures tend to build MODEM adapter card in the motherboard. Although this approach saves the installation trouble for the user, it creates another trouble for the motherboard manufacturers. The reason is that each country has its own communication system and standard for the communication device manufactures to follow. For this reason, each MODEM need to pass the examination of an authorized organization to obtain a certificate of that country before it can be sold to the market. Since the MODEM is now built in the motherboard, the motherboard manufacturers must deliver the entire motherboard to the authorized organization for examination. In this case, it would inevitably increase the cost of the motherboard manufacturers, including delivery, time and labor.

SUMMARY OF THE INVENTION

Accordingly, it is an object of the present invention to provide an adapter circuitry which is easy to install and low in price for equipping a host computer with the capability of computer telephony when enabled by a driver and an application program.

It is another object of the present invention to provide an external adapter circuitry which is simple in structure and energy saving so that it does not need an external power line for power supply.

It is a further object of the present invention to provide an external adapter circuitry which is so compact that it is convenient for delivery, thereby to save the delivery cost.

It is yet another object of the present invention to provide a stand-alone adapter circuitry so that it can be sent for examination independently, thereby to simplify the certification process.

Preferred embodiments of the present invention preferably include a circuitry which is housed in a compact box. The compact box contains two phone jacks for connecting to a telephone line and a telephone set. The circuitry mainly includes two interfacing devices, one for interfacing the adapter circuitry and the phone line and the other for interfacing the host computer and the adapter circuitry. It also contains an A/D converter for converting analog signals to digital signals and a D/A converter for converting digital signals to analog signals. In addition, it also includes a couple of registers for latching signal-in and signal-out. More importantly, the power supply of the circuitry comes from a signal-to-power converter which obtains voltage by converting signals from a printer port.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

The adapter circuitry of the invention is operable by application software implemented in a computer for providing the functions of computer telephony. The modulation, demodulation, data computing, data processing and data permutation are all handled by application software. The adapter circuitry of the invention is only for signal relay.

Figure 1A:
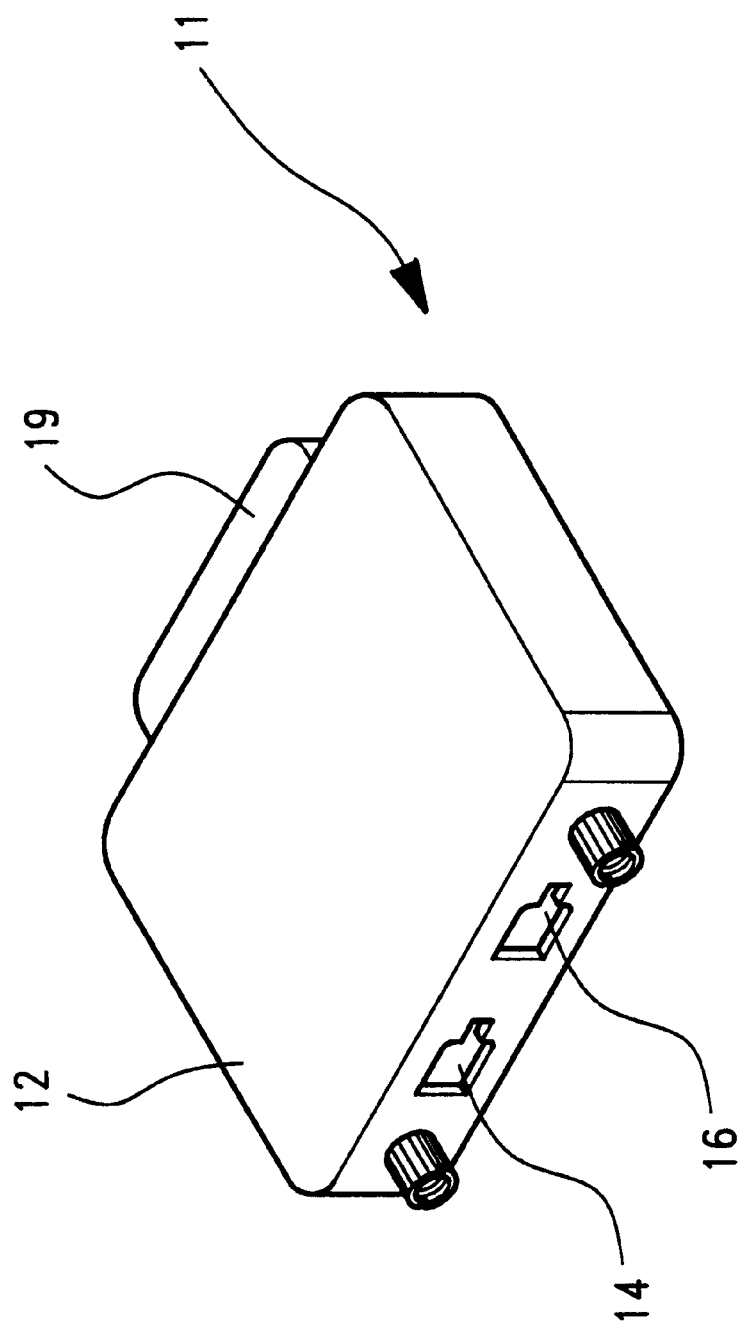
FIG. 1 A is a schematic diagram showing the outlook of the adapter circuitry according to the preferred embodiment of the invention.
FIG. 1B is a schematic diagram showing the adapter circuitry adapts to the printer port of a host computer.
Figure 1B:
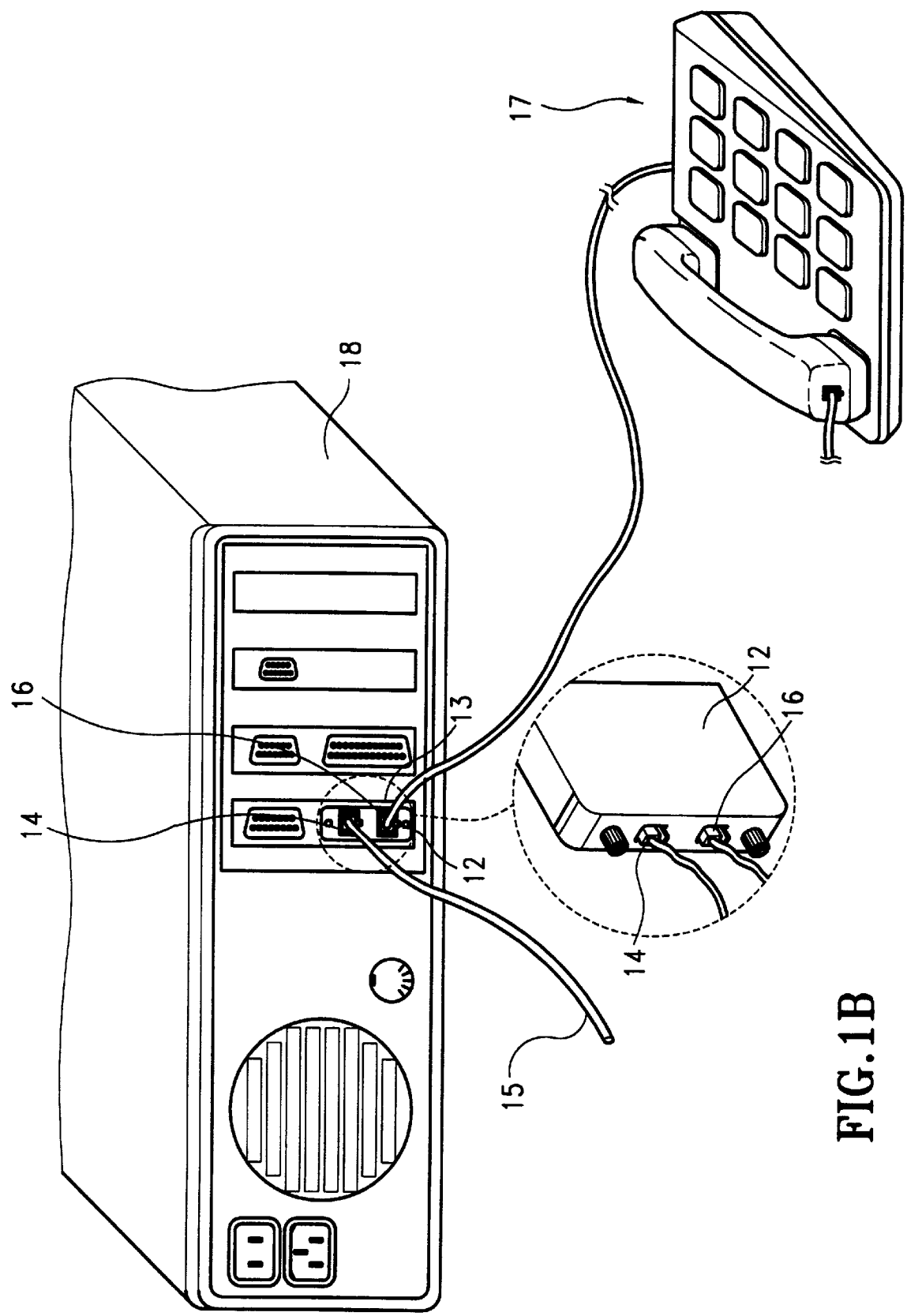

Refer to FIG. 1A, the external adapter circuitry 11 includes a circuitry which is housed in a compact box 12. The size of the compact box 12 is about the size of a common parallel port connector. It has a phone line connector 14, and a phone set connector 16. One end 19 of the compact box 12 can be plugged into the printer port 13 of a host computer 18 as shown in FIG. 1B. The phone line connector 14 connects to the telephone line 15 for communicating to a telephone company. The phone set connector 16 connects to a telephone set 17. It should be noticed that the compact box 12 does not contain any external cable because it does not need external power supply.

Figure 2:
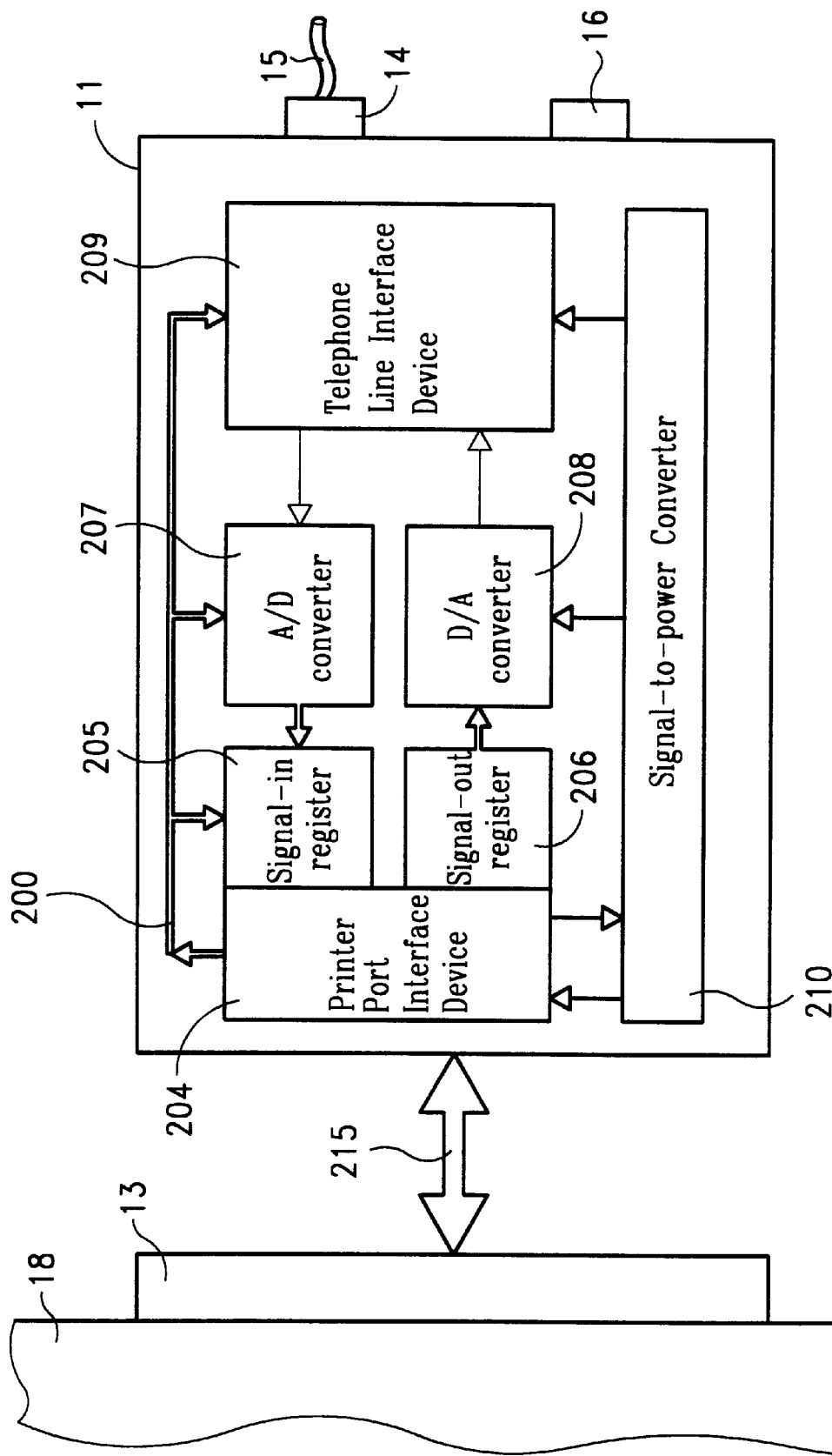
FIG. 2 is a schematic diagram showing the architecture of the circuitry according to the preferred embodiment of the invention.

The circuitry of the external adapter circuitry 11 is illustrated in FIG. 2. The circuitry mainly includes: a telephone line interface device 209, an A/D converter 207, a signal-in register 205, a printer port interface device 204, a signal-out register 206, a D/A converter 208 and a signal-to-power converter 210.

The telephone line interface device 209 follows an interface standard called Data Access Arrangement. The telephone line interface device 209 performs as an interface for communicating the data between the telephone line 15 and the host computer 18. To the telephone company, the function of the telephone line interface device 209 is like an ordinary telephone set. It detects when the phone is off-hook or on-hook by sensing a decrease in a differential voltage. When the ring signal comes from the telephone company, the telephone line interface device 209 will respond to that ring signal. If the host computer 18 is power-off, the phone call will be diverted to the phone set 17 via the phone set connector 16.

On the other hand, if the host computer 18 is power-on, the telephone line interface device 209 will send a signal to the phone set connector 16 to bypass the phone set connector 16 and then receive the call.

Since the signals from the telephone line interface device 209 called signal-in are analog signals. They have to be converted into digital signals via an A/D converter 207 before sending to the host computer 18 to be processed. The digitized signal-in will be temporarily latched in the signal-in register 205. The signals transferred to the telephone line interface device 209, the A/D converter 207, the signal-in register 205, and the printer port interface device 204 are controlled by the control signals of the control bus 200.

The printer port interface device 204 works as an interface between the printer port 13 and telephone line interface 209. The printer port interface 204 will forward the signal-in to the host computer 18 via the printer port 13 in response to a control signal. After an application program (not shown) of the host computer 18 finishes the data processing, the signal-out is sent back to the printer port interface device 204 via printer port 13. The signal-out will be latched in the signal-out register 206. In response to a control signal from the control bus 200, the signal-out will be sent to the D/A converter 208 for converting to analog signals. The analog signal-out will then be output to the telephone line interface device 209 for sending to the telephone line 15. It should be noted that the memory space required for the application program in the host computer 18 is so small that the application program would not affect the normal operations of the computer system.

The power supply for the above mentioned devices all comes from signal-to-power converter 210. The external adapter circuitry 11 therefore does not need external power line for power supply. Conventionally, a printer port 13 supplies high voltage and low voltage for exchanging data between an external machine and a host computer. When transferring data, the printer port can use a signal of 5 V or other voltages which are higher than the ground to represent a 5 V or other voltages. If the external machine does not have constant power supply of its own, it has to connect to an external power supply. For the present invention, the above mentioned devices are very compact. There is no processor or complex circuitry to consume electricity. Thus, the signal-to-power converter 210 utilizes the adjusted voltage of the printer port 13 for power supply by sending its high voltage to the VCC of above-mentioned devices, including telephone line interface device 209, A/D converter 207, signal-in register 205, printer port interface device 204, signal-out register 206, D/A converter 208, and signal-to-power converter 210. Since the invention is a very compact circuitry, it does not consume lots of electricity, therefore the voltage from the printer port 13 is sufficient for the entire circuitry to work normally.

A telephone line data transmission is two-way. Therefore, the data transmission in the external adapter circuitry 11 is also two-way. The signal-in and signal-out are transmitted in parallel simultaneously. When there is data for transmission, the control bus 200 sends the control signals to related devices for enabling or disabling the devices to receive or output signals. The devices include: telephone line interface device 209, A/D converter 207, signal-in register 205, printer port interface device 204, signal-out register 206, D/A converter 208, and signal-to-power converter 210. The speed of the data transmission is controlled by application software.

To sum up, an important feature of the present invention is that it is very simple in architecture so it does not need external power supply. All the computation and data processing is controlled and processed by the software and river implemented in the host computer. An advantage for the present invention is that its installation is very easy. It can simply be plugged into the printer port of a host computer. Moreover, since the adapter circuitry is a standalone device, it can be sent to be examined independently for obtaining a certificate. With all these features, the invention can efficiently overcome the problems of the prior art and successfully achieve the objects mentioned above.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An external adapter circuitry for communicating a host computer with a telephone line, comprising:

telephone line interfacing means for receiving a signal-in from a telephone line and transmitting a signal-out to said telephone line;

A/D converting means for receiving said signal-in and outputting a digitized signal-in;

first storing means for latching said digitized signal-in;

printer port interfacing means for transmitting said digitized signal-in to said host computer and receiving a digitized signal-out from said host computer in response to a control signal;

second storing means for latching said digitized signal-out from said printer port interfacing means;

D/A converting means for inputting said digitized signal-out and outputting an analog signal-out; and signal-to-power converting means for providing a high voltage converted from high voltage signals from a printer port of said host computer to said telephone line interfacing means, said A/D converting means, said first storing means, said printer port interfacing means, said second storing means, and said D/A converting means.

2. The external adapter circuitry as claimed in claim 1, further comprising:

a compact housing having a connector residing at one side of said housing for plugging into the printer port of said host computer and two connectors residing at another side of said housing for connecting to a telephone line and a telephone set respectfully.

3. The external adapter circuitry as claimed in claim 1, further comprising:

control bus for sending control signals to said telephone line interfacing means, said A/D converting means, said first storing means, said printer port interfacing means, said second storing means, and said D/A converting means.

4. The external adapter circuitry as claimed in claim 1, wherein said first storing means is a register.

5. The external adapter circuitry as claimed in claim 1, wherein said second storing means is a register.

6. The external adapter circuitry as claimed in claim 1, wherein said telephone line interfacing means follows the data access arrangement standard.

7. The external adapter circuitry as claimed in claim 1, said external adapter circuitry is operable by application software and a driver.

8. The external adapter circuitry as claimed in claim 7, wherein said application software executes modulation, demodulation, data computation, data processing and data permutation.

9. An external adapter circuitry operable by an application software and a driver for supporting computer telephony for a host computer, comprising:

a compact housing having a connector residing at one side of said housing for plugging into the printer port of said host computer and two connectors residing at another side of said housing for connecting to a telephone line and a telephone set respectively;

telephone line interfacing means for receiving a signal-in from said telephone line and transmitting a signal-out to said telephone line;

A/D converting means for inputting said signal-in and outputting a digitized signal-in;

first storing means for latching said digitized signal-in;

printer port interfacing means for transmitting said digitized signal-in to said host computer and receiving a digitized signal-out from said host computer;

second storing means for latching said digitized signal-out from said printer port interfacing means;

D/A converting means for inputting said digitized signal-out and outputting an analog signal-out;

signal-to-power converting means for providing a high voltage converted from high voltage signals from a printer port of said host computer to said telephone line interfacing means, said A/D converting means, said first storing means, said printer port interfacing means, said second storing means, and said D/A converting means; and control bus means for sending control signals to said telephone line interfacing means, said A/D converting means, said first storing means, said printer port interfacing means, said second storing means, and said D/A converting means.

10. The external adapter circuitry as claimed in claim 9, wherein said first storing means is a register.

11. The external adapter circuitry as claimed in claim 9, wherein said second storing means is a register.

12. The external adapter circuitry as claimed in claim 9, wherein said telephone line interfacing means follows a data access arrangement standard.

13. The external adapter circuitry as claimed in claim 9, wherein said compact housing is about the size of a common parallel port connector.

14. An external adapter circuitry for communicating a host computer with a telephone line, comprising:

a compact housing having a parallel port connector, a telephone line connector and a telephone set connector;

telephone line interfacing means coupled to said telephone line connector for receiving a signal-in from said telephone line and transmitting a signal-out to said telephone line;

A/D converting means for receiving said signal-in and outputting a digitized signal-in;

a first register coupled to said A/D converting means for latching said digitized signal-in;

printer port interfacing means coupled to said parallel port connector for transmitting said digitized signal-in to said host computer and receiving a digitized signal-out from said host computer in response to a control signal;

a second register coupled to said printer port interfacing means for latching said digitized signal-out from said printer port interfacing means;

D/A converting means coupled to said second register for inputting said digitized signal-out and outputting an analog signal-out;

signal-to-power converting means for providing a high voltage converted from high voltage signals from a printer port of said host computer to said telephone line interfacing means, said A/D converting means, said first register, said printer port interfacing means, said second register, and said D/A converting means; and a control bus for sending control signals to said telephone line interfacing means, said A/D converting means, said first register, said printer port interfacing means, said second register, and said D/A converting means.

15. The external adapter circuitry as claimed in claim 14, wherein said telephone line interfacing means follows a data access arrangement standard.

16. The external adapter circuitry as claimed in claim 14, said external adapter circuitry is operable by application software and a driver.

17. The external adapter circuitry as claimed in claim 16, wherein said application software executes modulation, demodulation, data computation, data processing and data permutation.

* * * * *